United States Patent
Wright et al.

(10) Patent No.: US 6,674,924 B2
(45) Date of Patent: Jan. 6, 2004

(54) APPARATUS AND METHOD FOR DYNAMICALLY ROUTING DOCUMENTS USING DYNAMIC CONTROL DOCUMENTS AND DATA STREAMS

(76) Inventors: Steven F. Wright, 1711 W. Saragosa St., Chandler, AZ (US) 85224; David W. Fye, 16047 S. 24th Pl., Phoenix, AZ (US) 85048; Mark A. Brown, 2130 E. Flintlock Way, Chandler, AZ (US) 85249

( * ) Notice: Subject to any disclaimer, the term of this patent is extended or adjusted under 35 U.S.C. 154(b) by 98 days.

(21) Appl. No.: 10/032,621

(22) Filed: Oct. 19, 2001

(65) Prior Publication Data

US 2002/0075514 A1 Jun. 20, 2002

Related U.S. Application Data

(63) Continuation-in-part of application No. 09/436,130, filed on Nov. 8, 1999, now Pat. No. 6,427,032, which is a continuation-in-part of application No. 09/001,228, filed on Dec. 30, 1997, now Pat. No. 6,192,165.

(51) Int. Cl.$^7$ .............................................. G06F 17/30
(52) U.S. Cl. ..................................... 382/306; 707/104.1
(58) Field of Search ...................... 707/1, 10.1; 382/306

(56) References Cited

U.S. PATENT DOCUMENTS

| | | | |
|---|---|---|---|
| 3,886,328 A | 5/1975 | Harms, Jr. et al. | 235/462.3 |
| 3,977,509 A | 8/1976 | Leersnijder | 400/103 |
| 4,283,621 A | 8/1981 | Pembroke | 235/375 |
| 4,587,411 A | 5/1986 | Obstfelder et al. | 235/437 |
| 4,692,041 A | 9/1987 | Dyma et al. | 400/82 |
| 4,985,863 A | 1/1991 | Fujisawa et al. | 707/5 |
| 5,039,847 A | 8/1991 | Morii et al. | 235/379 |
| 5,109,439 A | 4/1992 | Froessl | 382/305 |
| 5,126,540 A | 6/1992 | Kashiwagi et al. | 235/375 |
| 5,155,341 A | 10/1992 | Ohtani et al. | 235/375 |
| 5,179,649 A | 1/1993 | Masuzaki et al. | 715/507 |
| 5,188,464 A | 2/1993 | Aaron | 400/103 |
| 5,229,587 A | 7/1993 | Kimura et al. | 235/432 |
| 5,237,156 A | 8/1993 | Konishi et al. | 235/375 |
| 5,262,804 A | 11/1993 | Petrigrew et al. | 347/109 |
| 5,313,572 A | 5/1994 | Yamamoto et al. | 358/403 |
| 5,321,436 A | 6/1994 | Herbert | 347/14 |
| 5,339,412 A | 8/1994 | Fueki | 707/104.1 |
| 5,393,962 A | 2/1995 | Konishi et al. | 235/375 |
| 5,430,276 A | 7/1995 | Ohtani et al. | 235/375 |
| 5,448,375 A | 9/1995 | Cooper et al. | 385/403 |
| 5,451,760 A | 9/1995 | Renvall | 235/325 |
| 5,452,379 A | 9/1995 | Poor | 382/317 |
| 5,479,588 A | 12/1995 | Sawada et al. | 358/1.18 |
| 5,496,117 A | 3/1996 | Sawada et al. | 400/61 |
| 5,557,091 A | 9/1996 | Krummel | 235/462.08 |
| 5,768,416 A * | 6/1998 | Lech et al. | 382/180 |
| 6,123,362 A * | 9/2000 | Squilla et al. | 283/67 |
| 6,298,404 B1 * | 10/2001 | Mishra | 710/100 |
| 6,483,502 B2 * | 11/2002 | Fujiwara | 345/213 |

* cited by examiner

Primary Examiner—Jack M. Choules
(74) Attorney, Agent, or Firm—Schmeiser, Olsen & Watts

(57) ABSTRACT

According to the preferred embodiments, an apparatus and method for dynamic routing using dynamic data streams is disclosed. Dynamic routing using dynamic data streams facilitates the creation of a flexible paper gateway in a digital filing system that provides for receiving, processing and storing document images from a wide variety of sources. When thus implemented, dynamic routing allows the digital filing system to efficiently operate while providing digital filing services to a wide variety of users with different needs. Thus, the preferred embodiments provide for the efficient digital filing and efficient management of paper-based information from its receipt at the desktop through an indexing, scanning, image storage and image retrieval process.

64 Claims, 14 Drawing Sheets

```
<kwiktagdata>
<data>
<row>
        <queuetypeid>DocumentDiscriminator</queuetypeid>
        <source>
                <sourcedata>
                        <row>
                                <sourcename>FOLDER</sourcename>
                                <deviceserver>DevFax1</deviceserver>
                                <deletesimilarfiles>Yes</deletesimilarfiles>
                                <sourcefile>c:\job\ktagFolderInputSvc_temp\
                                357EE26086B481AA22F3206A0F55302.tif</sourcefile>
                        </row>
                </sourcedata>
        </source>
        <trace>
                <tracedata>
                        <row>
                                <traceid>DevIntegration</traceid>
                                <loglevel>1</loglevel>
                                <logtype>1</logtype>
                                <loglocation>c:\logs</loglocation>
                        </row>
                </tracedata>
        </trace>
        <docdiscriminatorflow>
                <docdiscriminatorflowdata>
                        <row>
                                <mainflow>
                                        <mainflowdata>
                                                <row>
                                                        <queuetypeid>BCR1</queuetypeid>
                                                </row>
                                                <row>
                                                        <queuetypeid>SplitTIF</queuetypeid>
                                                </row>
                                        </mainflowdata>
                                </mainflow>
```

FIG. 4a

```xml
<docflow>
    <docflowdata>
        <row>
            <progid>ktagDocLoc.DocLoc</progid>
        </row>
        <row>
            <progid>ktagStandardDoc.StandardDoc</progid>
        </row>
        <row>
            <progid>ktagValidateDoc.ValidateDoc</progid>
        </row>
    </docflowdata>
</docflow>
<nextstep>2</nextstep>
<complete>True</complete>
        </row>
    </docdiscriminatorflowdata>
</docdiscriminatorflow>
<job>
    <jobdata>
        <row>
            <joblocation>c:\job\InProcess</joblocation>
            <jobid>7357EE26086B481AA22F3206A0F55302</jobid>
            <jobextension>tif</jobextension>
            <pagecount>2</pagecount>
        </row>
    </jobdata>
</job>
<sourceinstruction>
    <sourceinstructiondata>
        <row>
            <documentthreshold>20</documentthreshold>
            <usedocloc>1</usedocloc>
            <batchstartensign>batsepa01</batchstartensign>
            <batchendensign>batsepa02</batchendensign>
            <deletesourcefile>1</deletesourcefile>
            <barcodethreshold>20</barcodethreshold>
            <requireindex>1</requireindex>
        </row>
    </sourceinstructiondata>
</sourceinstruction>
        </row>
    </data>
</kwiktagdata>
```

FIG. 4b

```xml
<barcode>
    <barcodedata>
        <row>
            <imagetag>123456789</imagetag>
            1
            <confidence>92</confidence>
            <orientation>90</orientation>
            <left>2485</left>
            <top>1280</top>
            <height>352</height>
            <width>85</width>
            <skew>0</skew>
            <time>0.80</time>
            <bcr>1</bcr>
            <lib>GGX</lib>
        </row>
    </barcodedata>
</barcode>
<process_stats>
    <process_stats_data>
        <row>
            <progid>ktagBCR1QC</progid>
            <processname>123456789</processname>
            <processelapsed>0.671000000002095</processelapsed>
            <createdate>7/24/2001 12:18:11 PM</createdate>
        </row>
    </process_stats_data>
</process_stats>
</row>
</data>
</kwiktagdata>
```

FIG. 5

```xml
<processedbarcodes>
    <processedbarcodesdata>
        <row>
            <barcodelength>9</barcodelength>
            <orientation>90</orientation>
            <barcodepage>1</barcodepage>
            <isvalidpage>True</isvalidpage>
            <barcode>123456789</barcode>
            <ignored/>
            <used>True</used>
        </row>
    </processedbarcodesdata>
</processedbarcodes>
<document>
    <documentdata>
        <row>
            <barcode>123456789</barcode>
            <orientation>90</orientation>
            <ignored/>
            <startpage>1</startpage>
            <endpage>2</endpage>
            <pages>2</pages>
            <isvaliddoc>False</isvaliddoc>
            <userid>900</userid>
            <orgid>900</orgid>
            <docid>16520</docid>
            <version>0</version>
            <drawerid>1759</drawerid>
            <isexpected>0</isexpected>
            <autoindex>0</autoindex>
        </row>
    </documentdata>
</document>
</row>
</data>
</kwiktagdata>
```

FIG. 6

```
<filelist>
    <filelistdata>
        <row>
            <filename>c:\job\InProcess\
            6B7B2BB968B54E4FB33B58A36606BB1B.tif</filename>
        </row>
    </filelistdata>
</filelist>
</row>
</data>
</kwiktagdata>
```

FIG. 7

```xml
<docimageinstr>
    <docimageinstrdata>
        <row>
            <instrid>250231</instrid>
            <instrtypeid>7</instrtypeid>
            <executeorder>7</executeorder>
            <progid>ktagAutoPilot.AutoPilot</progid>
        </row>
    </docimageinstrdata>
</docimageinstr>
<docimageinstructions>

<row>
            <instrid>250231</instrid>
            <instrtypeid>6</instrtypeid>
            <executeorder>6</executeorder>
            <progid>ktagImageProcessingLib.ImageProcessing</progid>
        </row>
        <row>
            <instrid>250231</instrid>
            <instrtypeid>1</instrtypeid>
            <executeorder>1</executeorder>
            <progid>ktagImageProcessingLib.ImageProcessing</progid>
        </row>
        <row>
            <instrid>250231</instrid>
            <instrtypeid>7</instrtypeid>
            <executeorder>7</executeorder>
            <progid>ktagAutoPilot.AutoPilot</progid>
        </row>

</docimageinstructions>
</row>
</data>
</kwiktagdata>
```

FIG. 7a

```xml
<docimageinstr>
    <docimageinstrdata>
      <row>
        <instrid>250231</instrid>
        <instrtypeid>7</instrtypeid>
        <executeorder>7</executeorder>
        <progid>ktagAutoPilot.AutoPilot</progid>
      </row>
    </docimageinstrdata>
  </docimageinstr>
  <docimageinstructions>

<row>
        <instrid>250231</instrid>
        <instrtypeid>6</instrtypeid>
        <executeorder>6</executeorder>
        <progid>ktagImageProcessingLib.ImageProcessing</progid>
      </row>
      <row>
        <instrid>250231</instrid>
        <instrtypeid>1</instrtypeid>
        <executeorder>1</executeorder>
        <progid>ktagImageProcessingLib.ImageProcessing</progid>
      </row>
      <row>
        <instrid>250231</instrid>
        <instrtypeid>7</instrtypeid>
        <executeorder>7</executeorder>
        <progid>ktagAutoPilot.AutoPilot</progid>
      </row>

</docimageinstructions>
  <deliveryinstr>
    <deliveryinstrdata>
      <row>
        <queuetypeid>ToKwikTag</queuetypeid>
        <deliverydata>
        <deliveryprovider>
        <name>ToKwikTag</name>
        <deliveryinstrid>100</deliveryinstrid>
      </row>
    </deliveryinstrdata>
  </deliveryinstr>
  </row>
 </data>
</kwiktagdata>
```

FIG. 7b

APPARATUS AND METHOD FOR
DYNAMICALLY ROUTING DOCUMENTS
USING DYNAMIC CONTROL DOCUMENTS
AND DATA STREAMS

RELATED APPLICATIONS

This application is a continuation-in-part of U.S. patent application Ser. No. 09/436,130, filed Nov. 8, 1999 now U.S. Pat. No. 6,427,032, which was filed as a continuation-in-part for U.S. patent application Ser. No. 09/001,228 now U.S. Pat. No. 6,192,165 filed Dec. 30, 1997.

BACKGROUND OF THE INVENTION

1. Technical Field

This invention generally relates to document management and more specifically relates to a system and method for indexing, imaging, storing, and retrieving paper-based documents.

2. Background Art

While most modern computer systems can be used for business, education and entertainment purposes, the most widespread application for computers today is related to processing information. Word processing, page layout, database, spreadsheet, and desktop publishing applications are used to prepare and disseminate information throughout society. The increased availability of computer systems and computer networks such as the Internet have made vast repositories of information available to a huge segment of our population. Indeed, as it has been widely discussed in the popular media, modern computer systems have brought our world into the "information age."

One of the promises of the information age ushered in by these omnipresent computer systems was the advent of a "paperless" society. Computers, in theory, would liberate the world from the flood of paper which currently impedes the flow and management of information. Computer-based systems with advanced information processing capabilities would supposedly allow the instantaneous electronic exchange of information from one location to another, without the necessity of "hard copy." Indeed, many businesses have embraced computer systems with the stated goal of eliminating, or at least significantly reducing, the seemingly endless stream of paper that flows into and out of an office. Reducing the burdens of paper-based information has become a widespread goal. However, the simple truth is that today we have more paper-based information, document processing labor costs, document storage overhead, and hard-copy related dependencies in our society than ever before.

In fact, the dream of a paperless society remains a faint gleam in the tired eyes of today's information workers. Reams and reams of paper continue to pile up on desktops and fill filing cabinets to overflowing in offices all over the world. If anything, the increased number of computers have exacerbated the rapidly increasing flow of paper in our society. In making information systems available to the masses, computers have allowed more and more people to generate ever growing quantities of paper which, in order to be useful, must be read and processed by someone, somewhere.

It is estimated that businesses worldwide generate more than 2 trillion pages of documents annually. In addition, in spite of the rapid proliferation of computer systems and computer users, it is estimated that less than 25% of the information used in the world today is available in a computer-accessible format. The average office worker spends 10%–40% of their time looking for information, much of it paper-based. And for every $1 spent producing a paper document, $10 dollar is spent to process and store that document. The very paperwork that drives most businesses and organizations is slowly starting to choke the productivity out of some of them as these businesses are unable to effectively and efficiently manage paper-based information.

Recognizing this problem, attempts have been made to better manage and control the paperwork that flows into the information stream each and every day. Some of these previously implemented solutions are based around the notion of creating, storing, and accessing electronic images directly in a computer system, bypassing hard copy completely. This solution makes sense only when a company or organization achieves fairly tight control over the generation and use of documents and can, therefore, effectively reduce the paper flow in certain situations. However, much of the paper burden in a given organization is directly attributable to paper-based documents that are generated by external sources. This means that most businesses and organizations, regardless of their internal systems, still receive and process paper-based information.

Other known solutions include document imaging systems which can scan paper-based documents and store/retrieve the resulting electronic images. Though many different document imaging systems have been commercialized since the late 1980s, none have gained widespread acceptance. Even though the quantifiable burdens of paper information storage, access and management are well known and uniformly decried, document imaging systems have not been broadly adopted as an alternative to the traditional filing cabinet. Document imaging systems today capture less than 1% of paper filing volumes. File cabinets continue to fill up, desktop stacks of paper continue to grow, and many business processes and desktops are still paper-bound. International Data Corporation (IDC) estimates that in 1997, U.S. business spent $25–35 billion on filing, storing and retrieving paper. This number approaches $100 billion when the total life cycle paper management costs are calculated, according to IDC.

A key reason for continued preference of paper-based document management over electronic document imaging systems, in spite of the problems and costs associated with the use of paper, stems from a fundamental impediment to the wide-scale adoption of imaging technology in the workplace. Basically, the lack of an efficient, cost-effective, adaptable method for driving paper through the scan and index process continues to thwart the efforts of most organizations that try to adopt wide-reaching document imaging solutions. The lack of simple, office automation platforms for image capture and indexing remains a key barrier to broadened use of document imaging.

Previous document management systems have also failed to have flexibility to provide document management solutions for documents that arrive from a wide variety of sources with a wide variety of processing directives and destinations. This lack of flexibility prevents the wide adoption of document management solutions.

Once these issues have been successfully addressed, an acceptable solution can be developed and adopted. However, without a better system and method for overcoming the significant limitations of the present document indexing, imaging, storage, retrieval, and handling systems, the world will be increasingly dependent on antiquated solutions which are continually decreasing productivity.

DISCLOSURE OF INVENTION

According to the preferred embodiments of the present invention, a apparatus and method for dynamic routing using dynamic data streams is disclosed. Dynamic routing using dynamic data streams facilitates the creation of a flexible paper gateway in a digital filing system that provides for receiving, processing and storing document images from a wide variety of sources. When thus implemented, dynamic routing allows the digital filing system to efficiently operate while providing digital filing services to a wide variety of users with different needs. Thus, the preferred embodiments provide for the efficient digital filing and efficient management of paper-based information from its receipt at the desktop through an indexing, scanning, image storage and image retrieval process.

The preferred embodiments of the present invention utilize a dynamic control document that is associated with each document image. Each dynamic control document stores data and instructions for the processing and storage of the document image. The dynamic control document controls the parameters of the document image processing from receipt through to final filing. Furthermore, as the document image is processed, the dynamic control document is updated to contain selected results from the document image processing.

By using the dynamic control document, the preferred method and apparatus provide a mechanism for the receipt, processing, indexing and filing of paper based documents with unparalleled efficiency and flexibility.

The foregoing and other features and advantages of the present invention will be apparent from the following more particular description of the preferred embodiment of the invention, as illustrated in the accompanying drawings.

BRIEF DESCRIPTION OF DRAWINGS

The preferred embodiments of the present invention will hereinafter be described in conjunction with the appended drawings, wherein like designations denote like elements, and:

FIGS. 4–7 are views of an exemplary dynamic control document at various stages of document image processing;

FIG. 10 is a typical label generated by the desktop label printer of FIG. 9 or the document labeling mechanism of FIG. 9a;

BEST MODE FOR CARRYING OUT THE INVENTION

Figure 1:
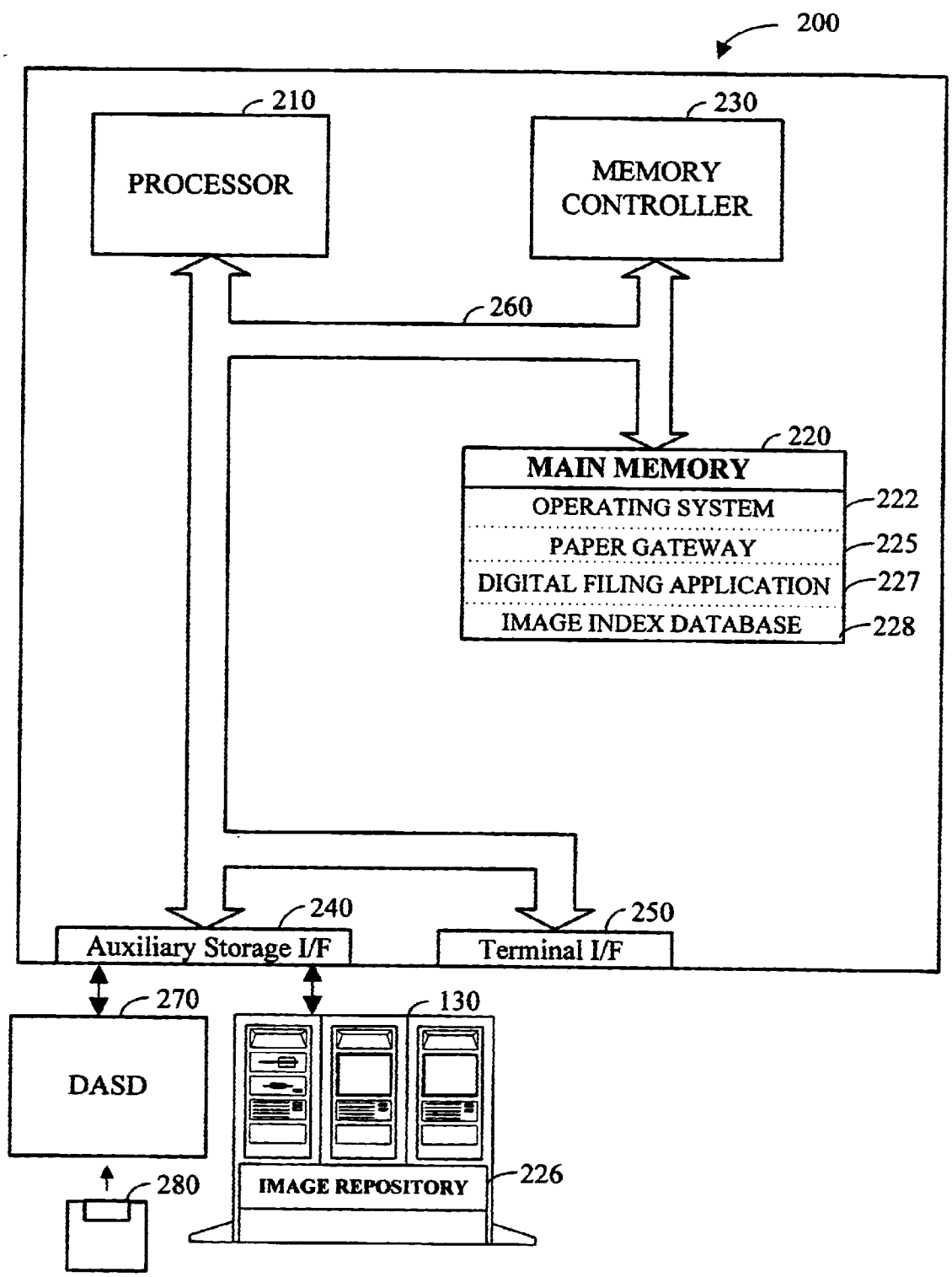
FIG. 1 is a block diagram of a computer system with a digital filing system for indexing, processing and storing document images according to the preferred embodiment of the present invention.

The present invention provides an apparatus and method for dynamic routing using dynamic data streams. Dynamic routing using dynamic data streams facilitates the implementation of a flexible paper gateway in a digital filing system that provides for receiving, processing and storing document images from a wide variety of sources. When thus implemented, dynamic routing allows the digital filing system to efficiently operate while providing digital filing services to a wide variety of users with different needs. Thus, the preferred embodiments provide for the efficient digital filing and efficient management of paper-based information from its receipt at the desktop through an indexing, scanning, image storage and image retrieval process.

The preferred embodiments of the present invention utilize a dynamic control document that is associated with each document image. Each dynamic control document stores data and instructions for the processing and storage of the document image. The dynamic control document controls the parameters of the document image processing from receipt through to final filing. Furthermore, as the document image is processed, the dynamic control document is updated to contain selected results from the document image processing.

By using the dynamic control document, the preferred method and apparatus provide a mechanism for the receipt, processing, indexing and filing of paper based documents with unparalleled efficiency and flexibility.

An overview of the digital filing system will now be provided, followed by a detailed description of the paper gateway and the use of a dynamic routing using dynamic data streams in the paper gateway.

Overview—Digital Filing System

When implemented as part of a digital filing system, the apparatus and methods of the present invention provide a flexible solution for indexing documents, imaging/scanning documents, storing documents, and retrieving documents.

By implementing the present invention, a user can quickly and easily manage paper-based documents in any business environment. The digital filing process involves receiving a paper-based document, indexing the document at the user's workstation, affixing a globally unique document identifier to the document, imaging/scanning the document, extracting the globally unique document identifier from the label, and electronically storing the document using the document identifier contained in the label and the user supplied indexing information. This process enables generic document imaging, using common office infrastructure, while adapting to various preferences for paper document disposition.

In addition, by attaching a pre-printed, globally unique document identifier to a paper-based document prior to scanning, other significant benefits can be achieved. For example, all paper-based documents can become self-managing during the image processing cycle from the point of scanning forward. This allows the indexing, scanning, storage, and retrieval processes to be physically and logically isolated. Finally, in the case of pre-printed labels, the nature of the globally unique, document identifier allows the labels to be attached to different types of documents without any predetermined relationship between the document, the document's content, and the pre-printed label. As an alternative to the most preferred embodiments of the present invention, a batch cover sheet containing the globally unique document identifier may be printed out and used in conjunction with a paper-based document to accomplish the same purposes.

Figure 8:
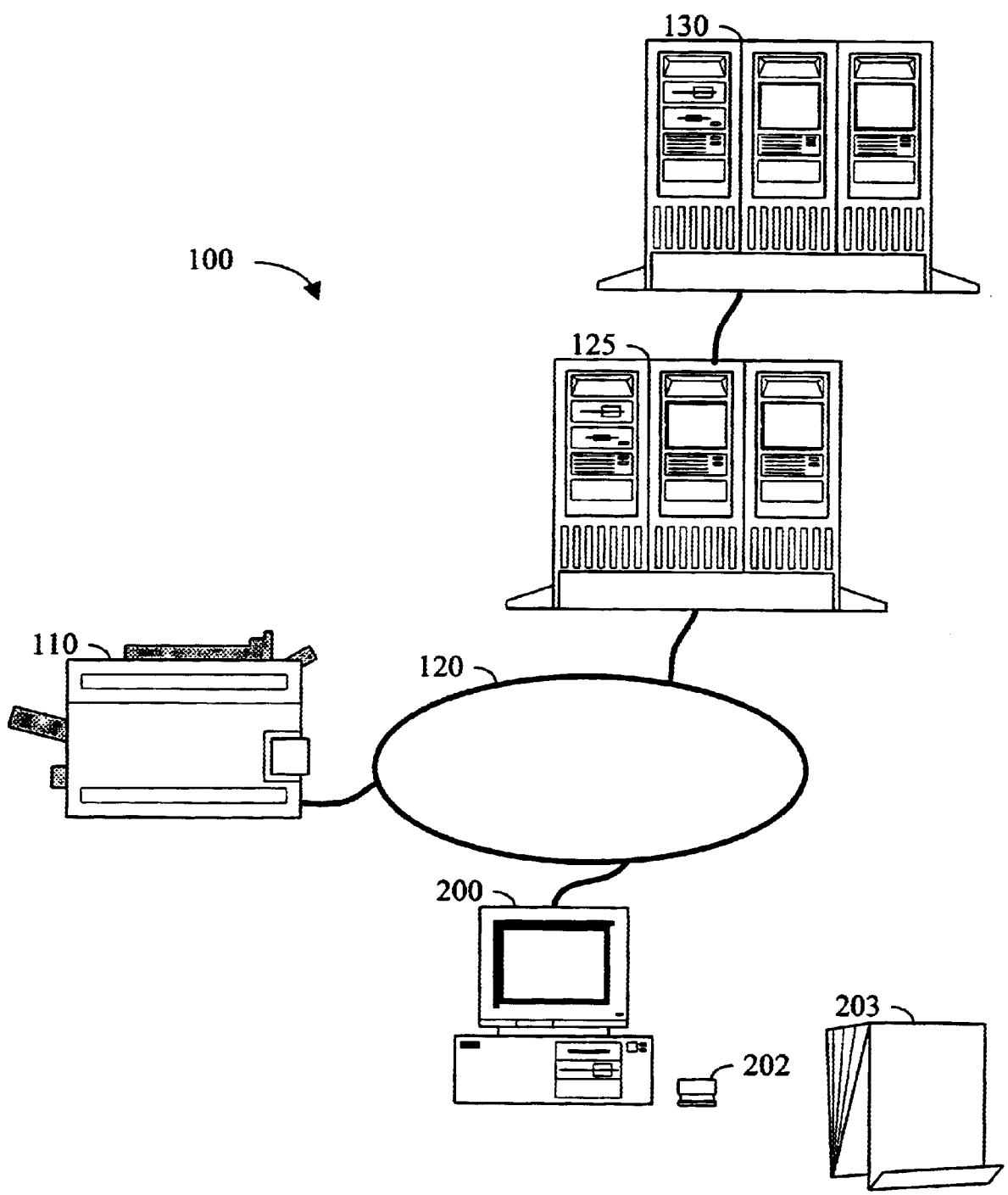
FIG. 8 is a block diagram of a digital filing apparatus for indexing, imaging, storing and retrieving documents according to a preferred embodiment of the present invention.

Referring now to FIG. 8, a digital filing system 100 according to a preferred embodiment of the present invention includes: a computer 200; a desktop label dispenser 202; an optional folding out basket 203; a document input mechanism 110; an image storage mechanism 130; and a communication link 120. Taken together, digital filing system 100 provides a way for office workers to index, store, and manage paper-based documents, regardless of their origin.

Desktop label dispenser 202 is a specialized device which is capable of dispensing pre-printed labels that will typically include a computer readable document identifier and/or bar code along with corresponding human-readable information (i.e., eye-legible content). The document identifiers, which in the most preferred embodiment are pre-printed on labels contained in desktop label dispenser 202, may be implemented as bar codes that conform to some industry accepted bar code standard such as interleaved 2 of 5, code 39, code 138, PDF 417, or other high-density symbology. Alternatively, proprietary or customized bar code symbologies may be employed.

Various label dispensers are further described in conjunction with FIGS. 9b, 9c, 9d, and 9e below. Alternatively, a desktop label printer or a desktop labeling mechanism (shown in FIGS. 9 and 9a) may be employed to print labels on demand. If a desktop label printer or desktop labeling mechanism is used to generate globally unique document identifiers and/or labels containing globally unique document identifiers, it may take the place of desktop label dispenser 202 shown in FIG. 8 and may be connected using any industry standard serial, parallel, or other computer connection. Additionally, in some preferred embodiments of the present invention, desktop label dispenser 202 may be used in conjunction with a desktop label printer or desktop labeling mechanism. The use of a desktop label printer or desktop labeling mechanism is described in conjunction with FIGS. 9 and 9a below. Regardless of the method used to produce the labels, each of the labels will contain a document identifier which is globally unique and which identifies the paper-based document to which the label is applied. A preferred embodiment of a representative label is further described in conjunction with FIGS. 10, 10a, and 10b below.

Folding out basket 203 is an optional accessory that can be effectively utilized with system 100. Folding out basket 203 is provided as a physical desktop storage and staging location, used for indexing paper-based documents, storing paper-based documents, and transporting paper-based documents after they have been indexed and labeled by the user. The paper-based documents can be staged in folding out basket 203 during the day and then transported to a centralized scanning location for batch scanning at pre-determined intervals or on an as-desired basis. In addition to folding out basket 203, additional system components such as collection and storage boxes/containers may be deployed. These collection and storage boxes may hold paper-based documents stored in multiple folding out baskets 203 and could be used to transport and archive the paper-based documents after they have been imaged using system 100.

Document input mechanism 110 is any type of device which is capable of scanning or imaging a document. For paper-based documents, flatbed scanners, drum scanners, digital copiers, fax machines, multi-function copiers ("mopiers"), etc. are all examples of document input mechanisms 110 which can be used in various embodiments of the present invention. The purpose of document input mechanism 110 is to scan/image a paper-based document and create a computer file that contains a digital image of a paper-based document. In addition, digital transmission of e-mail, faxes etc. may also be considered to be various forms of document input mechanism 110. If the document is already a digital image, then there is no need to scan the document, and the image can be stored directly.

The digital image of the paper-based document is then sent to the paper gateway system 125. As will be described in greater detail below, the paper gateway system 125 receives the digital image, processes it, and passes it to the image storage mechanism 130.

Image storage mechanism 130 represents large scale secondary storage for storing images which are scanned/imaged by document input mechanism 110. Various components such as hard disk drives, recordable CD-ROM/DVD drives and jukeboxes, magnetic tapes, and other devices known to those skilled in the art may be used to implement image storage mechanism 130. Digital document images captured by document input mechanism 110 may be transmitted to image storage mechanism 130 via communication link 120. Digital document images stored on image storage mechanism 130 may be transmitted to computer 200 via communication link 120. Image storage mechanism 130 may contain removable, transportable, image storage media, such as magneto-optical media, a DVD disk, or a CD-ROM disk. It should be noted that the while the paper gateway system 125 and the image storage mechanism 130 are illustrated in FIG. 1 as separate computer systems, they could in fact be implemented as parts of the same computer system.

Communication link 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. "intranet") via a wired or wireless connection, or any other suitable connection between computers and computer components, whether currently known or developed in the future. It should be noted that portions of communication link 120 may be a dial-up phone connection, broadcast cable transmission line, Digital Subscriber Line, ISDN line, or similar public utility-like access media. Computer 200 is further described in conjunction with FIG. 1 below.

In operation, a paper-based document is received by a user of system 100. The user will use system 100 to index the document. Indexing a document is the process of assigning "meta-data," thereby describing the document and/or the contents of the document, and using the computer to capture the meta-data. The meta-data, or indexing information, is stored in a record in an image index database at the time of indexing. System 100 generates or coordinates a globally unique image document identifier for the paper-based document at the point of indexing. Since system 100 tracks each unique document identifier, it can sequence through a series of pre-programmed document identifiers in a pre-programmed fashion. This sequence will match the sequence of the pre-printed labels exactly. Thus, the user can place a label containing the globally unique document identifier from label dispenser 202 onto the paper-based document. Since system 100 is tracking the document identifiers, the document identifier on the label can be matched to the next sequential document identifier available in system 100.

Since the two document identifiers match, the globally unique document identifier is used to effectively link the document image to the record in the database, facilitating later retrieval of the document image, typically via the indexes. Alternatively, computer 200 communicates with a desktop label printer which generates a label for the paper-based document that contains the globally unique document identifier and any other descriptive information used to identify the document, or uses a desktop labeling mechanism to print the globally unique document identifier directly onto the document. In any case, the software associated with system 100 provides the capability to "auto-increment" the document identifier, automatically creating or synchronizing the next identifier with the next identifier printed on the pre-printed labels.

After the globally unique identifier has been applied to the first page of the paper-based document, the document may be stored in folding out basket 203 until the document is ready to be introduced into system 100 using document input mechanism 110. In some preferred embodiments of the present invention, instead of placing a globally unique identifier on the first page only, a separate identifier may be placed on each page of a paper-based document prior to scanning. When the paper-based document is subsequently scanned, an image of the paper-based document (including the globally unique document identifier) is created. The image of the paper based document is then sent to the paper gateway system 125, where the previously-determined document identifier is extracted from the image. The paper gateway system then processes the image according to instructions that correspond to the document's identity. The processed image is then sent to the image storage mechanism 130 for storage.

Communication link 120 provides for communication between the various components of system 100 and allows the document image to be transmitted from device to device. In this fashion, a user can quickly and easily gain access to the electronic images of paper-based documents. Examples of communication link 120 include a Local Area Network (LAN), an Intranet, or the Internet. The connection made by communication link 120 may also be wireless. Communication link 120 logically links the physical components of system 100 together, regardless of their physical proximity. This is especially important because in many preferred embodiments of the present invention, it is anticipated that computer 200, document input mechanism 110, and image storage mechanism 130 may be geographically remote and that the indexing process, scanning/imaging process, and storage process will occur in sequential order but will be operationally independent. By labeling the document prior to scanning, and by pre-establishing the image identifier and including the identifier in the label, this method removes the need for any other communication or direct connectivity between the index, scan, and storage processes.

The image of the paper-based document carries the information necessary to link the index, scan, and storage processes, when and as necessary. In addition, by associating or assigning a given group of pre-printed labels containing unique document identifiers to an individual or group of individuals, greater security measures can be afforded to the digital images of the paper-based documents, once the paper-based documents are scanned. By examining the relationship between the identifier extracted from the digital image, "ownership" of the digital image can be established without further human intervention. Access to the digital images can then be controlled, as desired.

While designed primarily to deal with incoming paper-based documents, as mentioned earlier, it is also contemplated that incoming electronic documents (e-mail, documents downloaded from the Internet, etc.) could also be indexed and stored using system 100. In the case of electronic documents, the scanning/imaging of the document would not be necessary. In the case of electronic documents, the label containing the globally unique document identifier could be printed directly onto the lead page of a document. Then, when the document is subsequently scanned (if needed), the document identifier can be used to link the image of the document to a database containing the metadata for the document image. This is especially useful in situation such as delivery receipts, where an invoice is generated by a company, sent out for delivery, signed at the point of delivery and then returned to the point of origin for proof of delivery.

Figure 9:
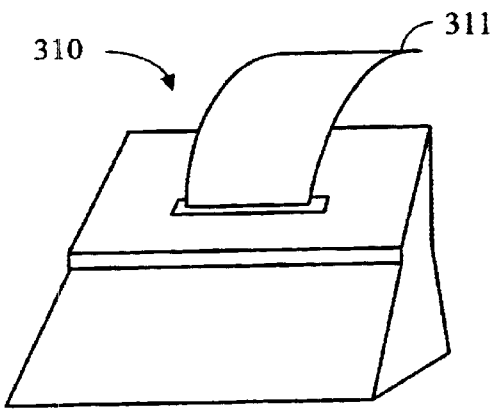
FIG. 9 is a perspective view of a desktop document label printing mechanism according to a preferred embodiment of the present invention.

Referring now to FIG. 9, a desktop label printer 310 according to a preferred embodiment of the present invention is shown. In a first preferred embodiment, desktop label printer 310 generates a bar code and eye-legible information on linerless label stock 311. Linerless label stock 311 can then be separated into individual labels that are subsequently applied by hand to a paper-based document which is to be scanned and stored using system 100 of FIG. 8. In an alternative preferred embodiment of the present invention, desktop label printer 310 is a standard printer and prints an entire document, with bar coded information contained on the printed document. This is especially useful when a company or organization is preparing paper-based documents which will be written upon and imaged at a later date. For example, if a company prints an invoice with a globally unique document identifier printed on it, the invoice can be sent out with a delivery driver, signed, and then returned to the company. After receipt, the paper-based invoice can be scanned using system 100 and the invoice will be automatically filed using the methods of the present invention.

Figure 9A:
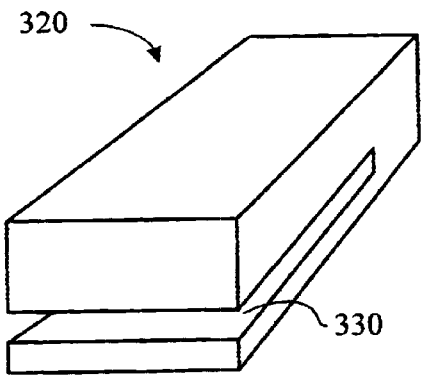
FIG. 9a is a perspective view of a desktop document labeling mechanism according to a preferred embodiment of the present invention.

Referring now to FIG. 9a, a preferred embodiment of a desktop labeling mechanism 320 prints and applies a label directly onto the paper-based document (like an electronic stapler). As shown in FIG. 9a, desktop labeling mechanism 320 has an opening 330 for receiving paper-based documents or pages of a paper-based document. The user can insert the paper into opening 330 and desktop labeling mechanism 320 will apply the printed label directly to the paper. In yet another alternative preferred embodiment of desktop labeling mechanism 320, the label information (bar code and eye-legible content) is printed directly on the paper-based document without using a separate label. The content of the bar code and eye-legible information for all of the labels described in conjunction with FIGS. 9, 9a, 9b, 9c, 9d, 9e, 10, 10a, 10b, 10c, and 10d is discussed in conjunction with FIGS. 11, 12, and 12a below.

Figure 9B:
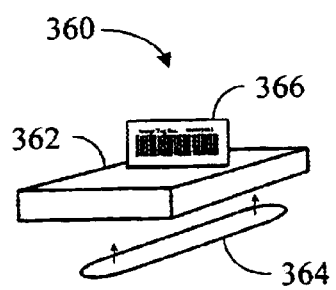
FIG. 9b is a perspective view of a desktop label dispenser for dispensing pre-printed labels according to a preferred embodiment of the present invention.

Referring now to FIG. 9b, a desktop label dispenser 360 for dispensing pre-printed labels in accordance with a preferred embodiment of the present invention includes: a label containing portion 362; a selectively removable adhesive attachment portion 364; and a pad of pre-cut, individual, pop-up labels 366. Label dispensing portion 312 dispenses individual labels from pad 366 one at a time in a pop-up fashion. A single pop-up label 420 from a typical pad of pop up labels 366 is shown in FIG. 10b. FIG. 10c shows a side view of a pad of pop-up labels 366. In the most preferred embodiments of the present invention, selectively removable adhesive attachment portion 364 is a piece of double stick tape or other suitable mechanism for affixing label containing portion 362 to a desk top or other similar surface.

Figure 9C:
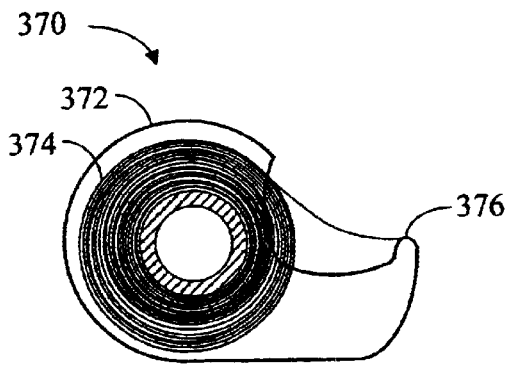
FIG. 9c is a side view of a desktop label dispenser for dispensing pre-printed labels according to an alternative preferred embodiment of the present invention.

Referring now to FIG. 9c, a desktop label dispenser 370 for dispensing labels in accordance with an alternative preferred embodiment of the present invention includes: a case portion 372; a roll of linerless labels 374; and a cutting edge 376. When using dispenser 370 to dispense individual labels from roll of labels 374, the user grasps the free end of roll of labels 374 and uses cutting edge 376 to separate a single label from roll of labels 374. In use, this is very similar to the action used to dispense a piece of clear plastic tape from a standard tape dispenser.

Figure 9D:
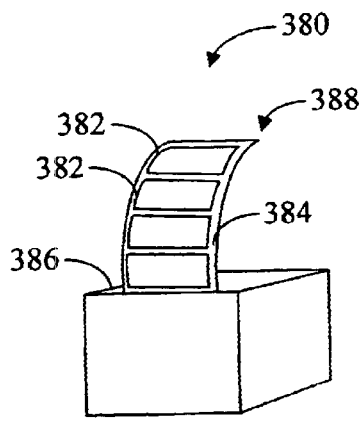
FIG. 9d is a perspective view of a desktop label dispenser for dispensing pre-printed labels according to an alternative preferred embodiment of the present invention.

Referring now to FIG. 9d, a desktop label dispenser 380 for dispensing labels in accordance with an alternative preferred embodiment of the present invention includes: a box portion 386 and a roll of labels 388. Roll of labels 388 comprises a backing liner 384 and a series of individual pre-cut, pre-printed labels 382. Box portion 386 is used to store and dispense individual pre-cut, pre-printed labels 382 from roll of labels 388.

Figure 9E:
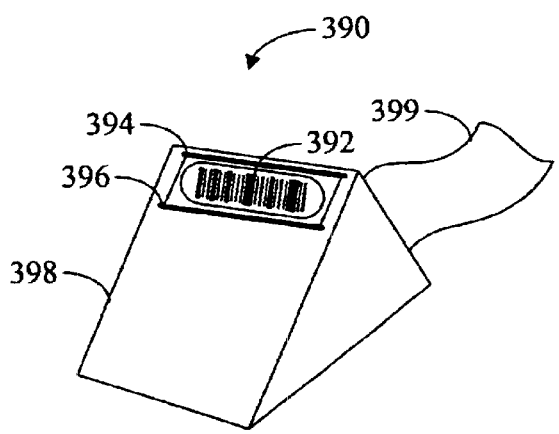
FIG. 9e is a perspective view of a desktop label dispenser for dispensing pre-printed labels according to an alternative preferred embodiment of the present invention.

Referring now to FIG. 9e, a desktop label dispenser 390 for dispensing labels in accordance with an alternative preferred embodiment of the present invention includes: a label-containing portion 398; a dispensing slot 396; a take-up slot 394; and a roll of individual, pre-cut, pre-printed labels 392 placed on backing liner 399. In use, label-containing portion 398 contains roll of labels 392 and backing liner 399 is fed first through dispensing slot 396 and then through take-up slot 392. This allows a user to grasp backing liner 399 with their hand and pull backing liner 399. As backing liner 399 is pulled, a single label 392 is displayed between dispensing slot 396 and take-up slot 394. The user can remove displayed label 392 from backing liner 399 and place it onto a document.

Figure 10:

Referring now to FIG. 10, a sample label 400 generated by desktop labeling mechanism 202 is illustrated. As shown in FIG. 4, label 400 contains two separate portions, an eye-legible information portion 410 and a computer readable bar code portion 420. Eye-legible information portion 410 is provided as a convenience for the user of system 100 and provides basic information about a paper-based document or about how a given paper-based document is to be processed. Computer readable portion 420 is used to contain, transport, and store the document identifier to be used when the scanned image is stored on image storage mechanism 130 of FIG. 8.

While the information contained in these two different portions may be identical, for security reasons the information in these two different portions may be different. It should be noted that the use of typical bar code symbology to encode the document identifier anticipates the use of many different types of symbologies. This includes those symbologies that represent digital information as shading within an icon (2d bar code symbologies) or any other symbology capable of representing large quantities of information in a digital format. In many preferred embodiments, the pre-printed document identifier will simply be a globally unique number represented in a traditional bar code symbology such as Interleaved 2 of 5 or code 39. Also note that the bar code or machine readable portion of the label may include additional information, besides the document identifier to be used when storing the digital image of the paper-based document. For example, information on document disposition or additional index data for the document may be contained in the bar code.

Figure 10A:
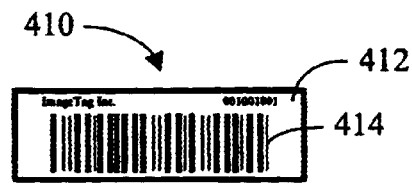
FIG. 10a is a typical label dispensed by the desktop label dispensers of FIGS. 9c, 9d, and 9e.
Figure 10B:
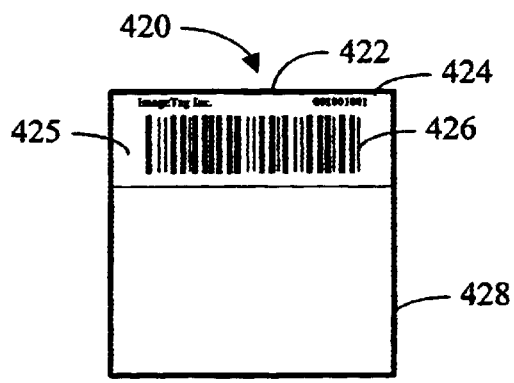
FIG. 10b is a typical label dispensed by the desktop label dispensers of FIG. 9b.
Figure 10C:
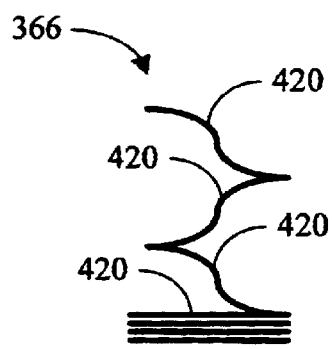
FIG. 10c is a side view of a pad of pre-printed labels dispensed by the dispenser shown in FIG. 9b.

Referring now to FIG. 10a, a sample pre-printed label 410, typical of the type of labels dispensed from desktop label dispensers 370, 380, and 390 is shown. Desktop label dispensers 370, 380, and 390 dispense individual labels from a roll of sequentially numbered labels. As with the label shown in FIG. 10, typical label 410 contains two separate portions, an eye-legible information portion 412 and a computer readable bar code portion 414.

The most preferred embodiments of pre-printed labels used in conjunction with the present invention utilize the Interleaved 2 of 5 bar code symbology to represent the document identifier for a digital image to be created in the future. When using pre-printed labels, digital filing application 227 is synchronized with the barcoded numbers on the pre-printed labels. Digital filing application 227 allows a user of system 100 to easily increment or decrement the numbers used as document identifiers to maintain synchronization, in case a user accidentally destroys a label. Since the pre-printed bar-coded numbers on the labels are sequential, once digital filing application 227 has been synchronized with the first pre-printed label, the numeric document identifiers created by digital filing application 227 and numbers on the pre-printed labels advance in lock-step sequence. Once a roll or pad of labels has been expended, a new roll or pad of labels can be loaded and synchronized with digital filing application 227 once again.

Referring now to FIG. 10b, a typical pre-printed label 420, dispensed by desktop label dispenser 360 (shown in FIG. 9) is shown. Label 420 is typical of a single label dispensed from pad 366, as shown in FIG. 10c. As shown in FIG. 10b, label 420 contains an eye-legible information portion 424 and a computer readable bar code portion 426 printed on an acetate or similar film product 422. Label 420 most preferably comprises an opaque portion 425 and a clear portion 428. Eye-legible information portion 424 and a computer readable bar code portion 426 are printed on opaque portion 425. In the most preferred embodiments of the present invention, the surface of clear portion 428 is suitable for writing upon. This allows the user to make comments regarding the paper-based document to which it is attached.

Referring now to FIG. 10c, pad 366 is composed of a series of individual labels 420. The individual labels 420 are joined together by an adhesive such that they form a fan-fold configuration. When the user pulls a first label 420 from dispenser 360, the next label 420 is pulled into the dispensing position by the force of removing the first label 420, in a pop-up fashion. Similarly, when the second label 420 is pulled from dispenser 360, the third label 420 is pulled into the dispensing position. In this fashion, each of the individual labels 420 in pad 366 can be dispensed one at a time and applied to documents.

Figure 10D:
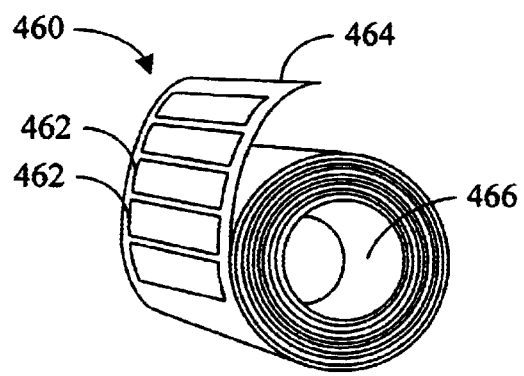
FIG. 10d is a perspective view of a roll of pre-printed labels dispensed by the dispensers shown in FIGS. 9d and 9e.

Referring now to FIG. 10d, an alternative preferred embodiment for a roll of individual pre-printed labels 460 is shown. Roll 460 is typical of the type of labels which could be dispensed from label dispensers 380 and 390. Roll 460 comprises a backing liner 464 and a series of individual pre-printed, pre-cut labels 462 wound on an optional core 466. Optional core 466 is used to provide stability for roll 460 during the dispensing operation and may be sized as required. Labels 462 may be printed on any suitable pressure sensitive adhesive backed paper. Labels 462 may utilize a repositionable adhesive or a permanent adhesive, depending on the application requirements.

Figure 11:
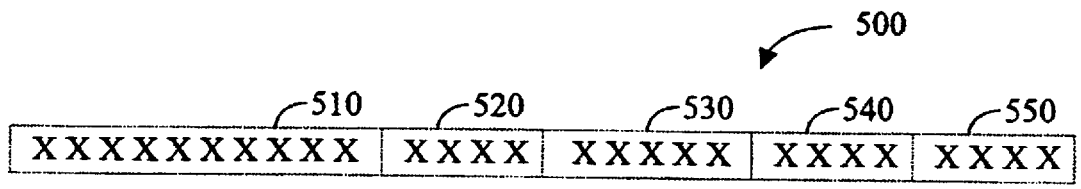
FIG. 11 is a generic illustration of a document naming and labeling convention according to a preferred embodiment of the present invention.

Referring now to FIG. 11, a generic description of the content of a label 500 according to a preferred embodiment of the present invention is described. As shown in FIG. 11, label 500 includes a unique document number, which can be used to relate the scanned image to the image file name or which can become the actual image file name after the document is scanned and may include the following components: a software serial number field 510; a security field 520; an indexing date field 530; a UserID field 540; and a document counter field 550. Software serial number field 510 is used to identify a unique customer. It is anticipated that each copy of the software program product which provides the features of the present invention will have a unique serial number associated with it. This will provide a unique code to identify each user of a system 100 that, when concatenated with the other numbers, will guarantee that each document number will be globally unique. This is important because it is anticipated that third party vendors will be providing storage space for images and vendors must have a reliable method of uniquely identifying, segregating, securing, and storing images from multiple clients. One alternative preferred embodiment of the present invention will use the serial number or a unique customer identification number to identify each client in a database over the Internet.

When using pre-printed labels, individual users of system 100 will be assigned ranges of numbers and no pre-printed labels will provide duplicate numbers. Alternatively, different symbologies can be used by different users, and the numbers from one symbology can thereby be distinguished from identical numbers created using a different symbology. In the case of pre-printed numbers, the only piece of information that will be printed on the label will be the numeric document identifier. The other information shown in FIG. 11 can still be stored in image index database 228 and accessed by referencing the unique document identifier contained in a label.

Security field 520 is used to provide various security features, such as a user-established code to ensure that document numbers are established under the control or security of the company that owns the documents. In addition, security field 520 can customized and configured to provide internal security measures, thereby limiting access to sensitive document images. Indexing date field 530 provides the date that the document was indexed by the user of system 100. UserID field 540 is used to identify the user who indexed the document for storage. The identity of the user is typically determined by the system via logon ID. Document counter field 550 is used to track the number of documents indexed by a user on a given date.

Figure 12:
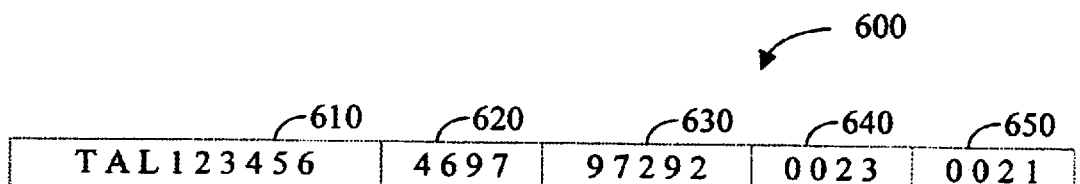
FIG. 12 is a specific illustration of a document naming and labeling convention according to a preferred embodiment of the present invention.

Referring now to FIG. 12, a specific example of a label 600 with field components corresponding to FIG. 11 is illustrated. As shown in FIG. 12, software serial number field 610 contains "TAL123456." This identifies a specific customer and can pinpoint the licensed digital filing application software that issued that specific document number. As shown in FIG. 12, security field 620 contains a security code "4697" which describes a user-defined security aspect for accessing this particular document. Indexing date field 630 contains "97292" which is the Julian date representation for the date of the indexing session (i.e., Oct. 19, 1997). UserID field 640 contains the user identification number "0023. This indicates that user 0023 is the user who indexed the document. Document counter field 650 contains "0021" which indicates that this particular label is being generated for the $21^{st}$ document indexed on this date by this user. To create an image storage file name, a file name extension is appended to the number shown in FIG. 12. To accommodate image file formats and conventions that require unique file names for each individual page of a multi-page document, an optional page-numbering field may also be appended to the number shown in FIG. 12. In addition, other fields for other purposes may also be added. It is contemplated that various additional fields will be developed for specific processing environments.

Figure 12A:
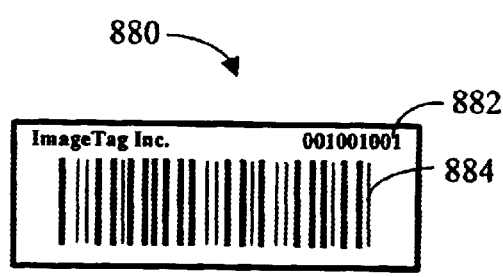
FIG. 12a is a specific illustration of a label according to a preferred embodiment of the present invention

Referring now to FIG. 12a, a specific example of a simplified label 880 is illustrated. As shown in FIG. 12a, eye-legible portion 882 contains the numeric value 001001001. This numeric value is actually the same as the bar-coded number represented in bar code portion 884. In this embodiment, only the number contained in eye-legible portion 882 and bar code portion 884 is used as the unique document identifier for the digital image of the paper-based document to which label 880 is attached.

The above description of a digital filing system lays out the general operation of the digital filing system. A detailed description of the paper gateway system will now follow, including a description of how the paper gateway system using dynamic routing to implement a flexible
Detailed Description Referring now to FIG. 1, a computer 200 in accordance with a preferred embodiment of the present invention is an IBM compatible personal computer system. However, those skilled in the art will appreciate that the methods and apparatus of the present invention apply equally to any computer system, regardless of whether the computer system is a complicated multi-user computing apparatus or a single user device such as a personal computer or workstation. Specifically, it is envisioned that a hand-held computer or palm computing device may perform all or substantially all of the functions described in conjunction with computer 200.

Figure 2:
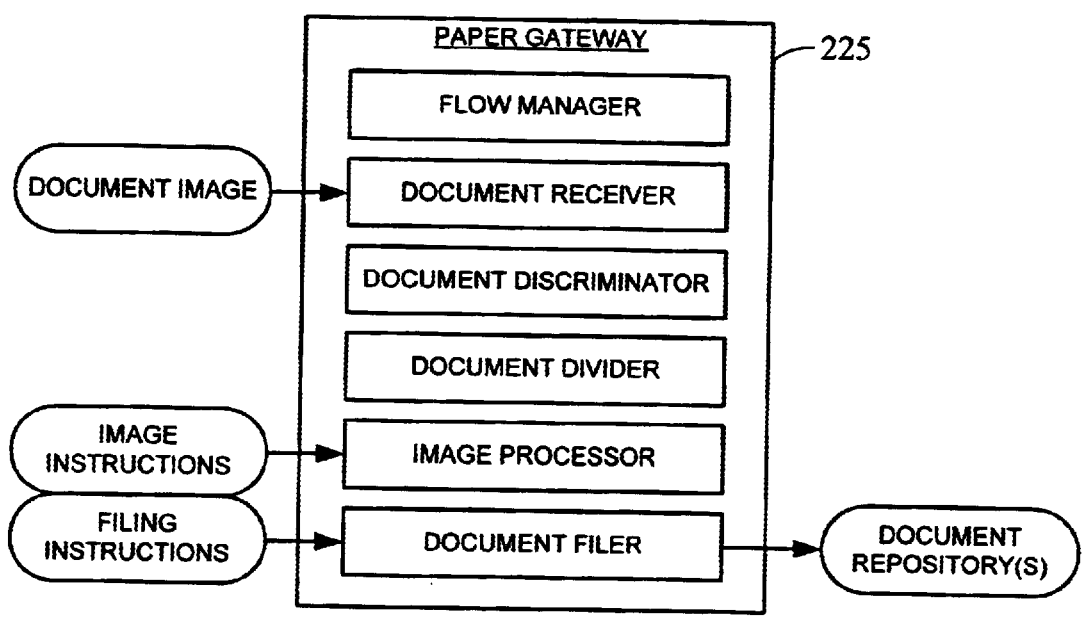
FIG. 2 is a schematic block diagram of a paper gateway in accordance with the preferred embodiments.

Computer 200 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to computer system 200 illustrated in FIG. 2 within the scope of the present invention such as the addition of cache memory or other peripheral devices. For example, computer 200 will also include a monitor or other display device (not shown) connected to the system bus 260. Alternatively, it is anticipated that computer 200 may be a terminal without a CPU that is connected to a network as a network computer (NC). In that case, the responsibilities and functions of CPU 210 will be assumed and performed by some other device on the network. FIG. 2 is not an exhaustive illustration of any specific computer system or configuration, but is presented to simply illustrate some of the salient features of one preferred embodiment for computer system 200.

Processor 210 performs computation and control functions of computer 200, and may comprise a single integrated circuit, such as a microprocessor, or may comprise any suitable number of integrated circuit devices and/or circuit boards working in cooperation to accomplish the functions of a processor. Processor 210 typically executes and operates under the control of an operating system 222 within main memory 220.

Auxiliary storage interface 240 allows computer 200 to store and retrieve information from auxiliary storage devices, such as image storage mechanism 130, magnetic disk drives (e.g., hard disks or floppy diskettes) or optical storage devices (e.g., CD-ROM). One suitable storage device is a direct access storage device (DASD) 270. As shown in FIG. 2, DASD 270 may be a floppy disk drive which may read programs and data from a floppy disk 280. It is important to note that while the present invention has been (and will continue to be) described in the context of a fully functional computer system, those skilled in the art will appreciate that the various mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor (not shown) separate from processor 210, is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with computer system 200, normally through programmable workstations. Although computer 200 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 suitably contains an operating system 222, a paper gateway application 225, a digital filing application 227; and an image index database 228. The term "memory" as used herein refers to any storage location in the virtual memory space of computer 200. It should be understood that main memory 220 will not necessarily contain all parts of all mechanisms shown. For example, portions of operating system 222 may be loaded into an instruction cache (not shown) for processor 210 to execute, while other files may well be stored on magnetic or optical disk storage devices (not shown). In addition, although image index database 228 is shown to reside in the same memory location as operating system 222, it is to be understood that main memory 220 may consist of multiple disparate memory locations.

Operating system 222 includes the software which is used to operate and control computer 200. Operating system 222 is typically executed by processor 210. Operating system 222 may be a single program or, alternatively, a collection of multiple programs which act in concert to perform the functions of any typical operating system, which functions are well known to those skilled in the art.

Image repository 226 can again be any type of computer filing or storage structure known to those skilled in the art. For example, image repository 226 can simply be a directory or subdirectory or a series of directories or subdirectories containing a series of images where each image has a globally unique document identifier, taken from the pre-printed labels or, alternatively, created and assigned. In one preferred embodiment of the present invention, image repository 226 may be a Structured Query Language (SQL) compatible database file capable of storing records containing images. In another preferred embodiment of the present invention, image repository 226 is an image directory on a DVD or CD-ROM disk which can be easily transported from one geographic location to another. In another preferred embodiment, image repository 226 is implemented by a third party and provided as a service to its customers. It should be noted that the image repository 226 could be implemented in a geographically distinct location from the application elements of FIG. 1.

Digital filing application 227 provides the user interface to allow the user to enter indexing and other information about paper based documents that will be filed in the image repository 226. In one preferred embodiment of the present invention, digital filing application 227 works in conjunction with a user's web browser to provide the various functions of the present invention including a user interface and indexing tools used to prepare a document for subsequent scanning/imaging and electronic filing. Alternatively, digital filing application 227 may be a stand-alone program product which does not use a web browser for additional functionality and operates over an office intranet, in conjunction with any typical network operating system such as Windows NT.

Digital filing application 227 can also incorporate standard database management tools to provide record management capabilities (add, modify, delete, etc.) for image repository 226 and image index database 228 and various administrative utilities. For example, digital filing application 227 can incorporate an auto-rotate mechanisms, audit/action mechanisms, and security mechanisms.

The image index database 228 is a database used to store indexing information for the document images. Preferably, image index database 228 is implemented with a Structured Query Language (SQL) compatible database file capable of storing information, including indexed document names, for the images stored in image repository 226. In addition, image index database 228 may be physically located in a location other than main memory 220. For example, image index database 228 may be stored on an external hard disk drive (not shown) coupled to computer 200 via auxiliary storage I/F 240. Alternatively, image repository 226 and image index database 228 may each be stored at different remote locations which are accessible via the Internet, by utilizing a web browser.

It should be noted that an image or images from image repository 226 may be loaded into main memory 220 and/or a cache memory storage location (not shown) for viewing by digital filing application 227 and/or web browser. As is typical for web browsers, previously viewed images may be recalled by using a "back" or "forward" button. Since the present invention works with standard web browsers, this functionality will be available for images viewed using digital filing application 227. If a web browser is not utilized, any other standard image viewer may be employed. Since the images will be stored using industry standard formats such as portable document format (PDF) or tagged image file format (TIFF), those skilled in the art will recognize that there are many options for viewing images, including readily available system software and viewers that can be downloaded from the internet. In addition, the use of PDF and TIFF is not exhaustive, it is anticipated that various types of image formats may be used in various preferred embodiments of the present invention. The most preferred embodiments of the present invention also use the header of the digital image file to store index information related to the digital image. In this fashion, a complete restoration of image index database 228 can be reconstructed from image repository 226.

The paper gateway 225 provides an interface for receiving and processing document images and then routing those document images to image repository 226. The paper gateway 225 preferably uses dynamic control documents to dynamically route document images through the paper gateway. When thus implemented, dynamic routing allows the digital filing system to efficiently operate while providing digital filing services to a wide variety of users with different needs. Thus, the preferred embodiments provide for the efficient digital filing and efficient management of paper-based information from its receipt at the desktop through an indexing, scanning, image storage and image retrieval process.

Turning now to FIG. 2, a more detailed functional block diagram of the paper gateway 225 is illustrated. The paper gateway preferably includes a flow manager, document receiver, a document discriminator, a document divider, an image processor and a document filer. It should at the outset be understood that these features may be implemented as separate elements, or their functionality combined into fewer multipurpose elements.

The paper gateway preferably uses a dynamic control document associated with each document image to direct the operations performed on that document image. Each dynamic control document stores data and instructions for the processing and storage of the document image. As the document image is processed through the paper gateway, the dynamic control document is updated to reflect the results of that processing. In the most preferred embodiment, the dynamic control document is implemented using extensible markup language (XML)

In particular, the flow manager controls the flow of a document image through the paper gateway. This includes directing the document image through the various other elements of the paper gateway. For example, the flow manager controls when a document image is sent to the document discriminator for barcode recognition, when it is send to the image processor for processing, and when it is sent to the document filer for filing and storage. The flow manager operates by parsing the dynamic control document that is created for each document image, determining from the dynamic control document what is the next step for the document image is, and passing the document image to the element that performs that step. The flow manager and other elements also update the dynamic control document as the document is processed. Because the processing of the document image is determined by the dynamic control document, the flow manager does not have to know any details of the document image and its processing other than what is described in the dynamic control document. This allows the flow manager to be implemented as simply as possible. It also allows changes in the flow to be easily made by changing how the dynamic control document is updated.

When a document image is first received by the paper gateway, it is sent to the document receiver. The document receiver can receive document images from any suitable source and queue them for processing. For example, the document receiver can be adapted to receive document images by email, by fax, through the internet, or from any other network source, such as scanners on local and wide area networks. This allows users to send the paper gateway images in any way that is convenient to them.

For example, if a user is away from their work computer, the image can be sent using any suitable fax machine. In this case, the document receiver acts as, or is coupled to, a receiving fax machine to receive the document image. In another example, the end user sends the document image as a email attachment, and the document receiver takes the attached document image to queue it for processing. Finally, in a third example, the document image is sent to the paper gateway using an internet protocol such as FTP.

In some embodiments it may be desirable for the document receiver to convert received images into a different file format. For example, it may be preferably for all image processing to be done in a common format such as tagged image format (TIFF), portable document format (PDF) or any other format. In this case, the document receiver receives the document, determines if a conversion is needed, and performs the conversion to the desired file format.

In accordance with the preferred embodiment, the document receiver also creates the dynamic control document that is associated with each document image. As stated above, the paper gateway uses the dynamic control document to dynamically store and update processing and storage instructions for the associated document image. The paper gateway thus uses the dynamic control document to store data and instructions for the processing and storage of the document image. The dynamic control document controls the parameters of the document image processing from receipt through to final filing. Furthermore, as the document image is processed, the dynamic control document is updated to contain selected results from the document image processing. By using the dynamic control document, the paper gateway is able to provide a mechanism for the receipt, processing, indexing and filing of paper based documents with unparalleled efficiency and flexibility.

The document discriminator searches document images for the globally unique identifier used to identify the document image and relate that document image to its indexing information and other document details. Typically, the globally unique identifier is put on the document in the form of a barcode or other computer readable format. The document discriminator searches each page of received document images for the globally unique identifier. Preferably, the globally unique identifier is placed on the first page of each document. Thus, the document discriminator can determine when the document begins by locating the barcode and when the second document begins by locating the second barcode. Also, when a globally unique identifier is located and identified, the document discriminator determines whether or not the located identifier is valid.

The document discriminator can be implemented using multiple elements that use different search parameters and techniques. For example, different elements can search different types of documents in different types of ways. Different documents can be searched with fast, normal, and extensive search routines.

When the document discriminator locates and determines the validity of the globally unique identifier, determines the beginning and end page of the document, it adds that information to the dynamic control document and passes the document image back to the flow manager.

The document divider breaks up the document image into separate documents corresponding to the beginning and end pages located by the document discriminator. The document divider then creates a dynamic control document for each of these separate documents, and copies the specific information for each document into its corresponding dynamic control document. In this application, one implementation of the document divider will be referred to as a split tiff component The image processor performs processing for each of the document images. When the image processor receives an image, it checks a database of image instructions to determine what type of processing is required for the image. The image instruction database stores the preferences for images that have been supplied by the user for their images. This information could have been provided through the indexing processes such as through a website. Examples of image processing include performing image cleaning and clarification, rotating the image, and performing optical character recognition on the image. The image processor can also convert the image to a different file format when requested.

The document filer directs the storage of the document image and related information. The document filer checks a database of filing instructions to determine where and how the document image is to be filed. The filing instructions, like the image instructions, are specified by the user. The document filer can store the document image in many different ways. For example, the document image and indexing information can be sent back to the user for storage on their local machine. The document image can be stored by a company that operates the paper gateway and provides online storage as a service to its customers. The document image could also be sent to a third party document storage service. The details of the storage, including the filing names and locations, can be determined by the filing instructions, or be supplied by the third party providing document storage.

Figure 3:
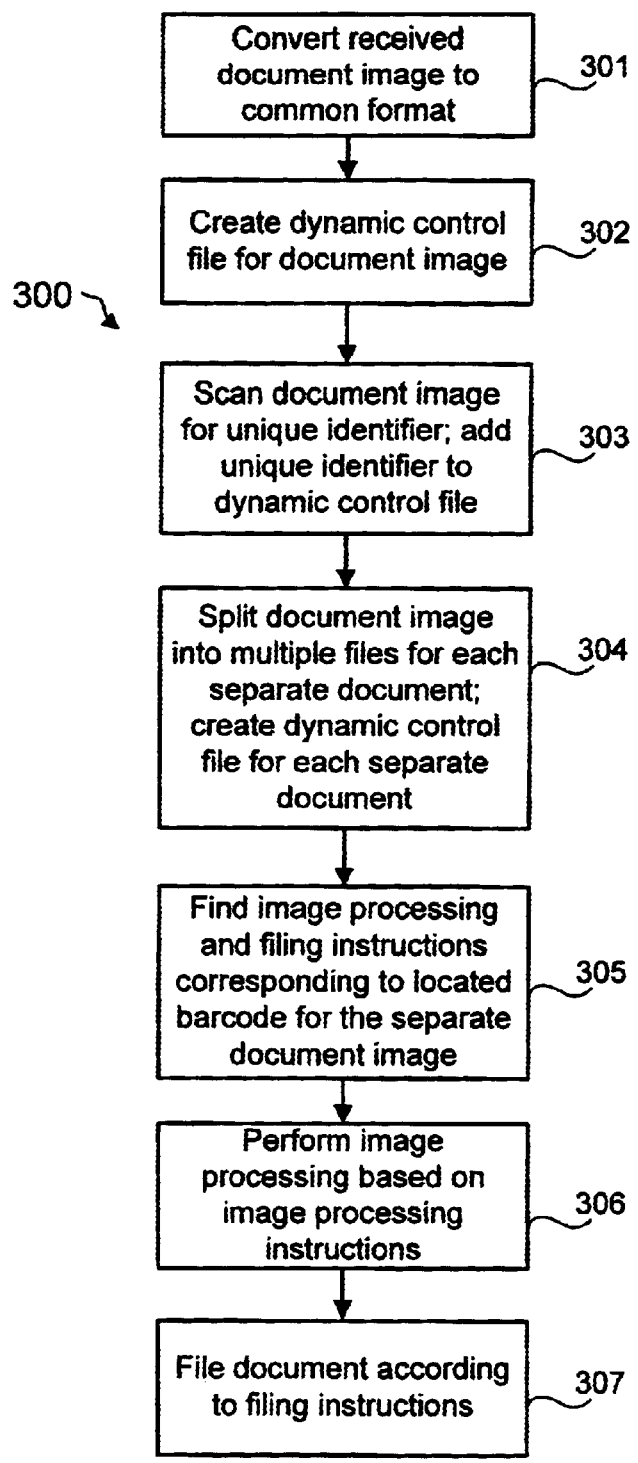
FIG. 3 is a flow diagram of a image processing method in accordance with the preferred embodiments.

Turning now to FIG. 3, a method 300 for processing document images is disclosed. The first step 301 is to convert the received document image into a common format. This step is generally preferable as it simplifies further processing. Additionally, it allows for the receipt of document images from a wide variety of sources, and in a wide variety of data types. For example, users may send document images as faxes or as email attachments. These documents can come in file formats such as PDF, JPEG, GIF and others. It will generally be desirable to put all the received document images into a common file format to simplify process. For example, the document images can be converted into a file format such as TIFF. It should be noted that this step is optional, as in some cases it may be desirable to leave the document images in their original format. It should also be noted that each of the different document receivers can use different processing instructions where needed.

The next step 302 is to create a dynamic control file for the document image. As described, the dynamic control file is created and associated with each document image to direct the operations that will be performed on that document image. Each dynamic control document stores data and instructions for the processing and storage of the document image. As the document image is processed through the paper gateway, the dynamic control document is updated to reflect the results of that processing. In the most preferred embodiment, the dynamic control document is implemented using extensible markup language (XML).

The next step 303 is to scan each page of the document image for the globally unique identifier. Typically, the globally unique identifier is placed on the first page of the document before scanning or faxing by the user. This global unique identifier can be in the form of a bar code or other machine readable format. The global unique identifier will then be used to associate the document image with its corresponding indexing information, image processing information and filing instructions. Preferably, the globally unique identifier is placed by the user on the first page of the document. When the globally unique identifier is located, that identifier (or an associated identifier) is added to the dynamic control file associated with the document image.

The next step 304 is to split document image into multiple files for each separate document in the document image and to create a separate dynamic control file for each of these documents. In many cases it is expected that, for convenience, a user will send multiple documents to the paper gateway together. For example, a user may combine several documents into one fax or email attachment. Because these documents are in fact separate, step 304 separates them into separate files for processing. Preferably, the user includes a different globally unique identifier on the first page of each separate document. Thus, when each page is scanned the system knows that a new document begins on any page in which a globally unique identifier is located. Thus, in step 304 the original document image is divided up into multiple document images and a dynamic control file is created for each separate document. Preferably, each dynamic control file is a copy of the original with any changes needed to reflect the identify of the associated separate document.

The next step 305 is to retrieve image processing instructions and filing instructions for the document images. The globally unique identifier for each of the document images is used to locate the proper instructions for the document from databases used to store these instructions. These instructions may be been specified by the user when setting up their account, or during the indexing procedure, or may have been specified at any other time (such as using a web site set up for this purpose).

The next step 306 is to perform image processing according to the retrieved image processing instructions. Examples of image processing include performing image cleaning and clarification, rotating the image, performing optical character recognition on the image. Image processing can also include converting the image to a different file format.

The next step 307 is to file the document image according to the filing instructions. This filing can be done in many different ways. For example, the document image and indexing information can be sent back to the user for storage on their local machine. The document image can be stored by a company that operates the paper gateway and provides online storage as a service to its customers. The document image could also be sent to a third party document storage service. The details of the storage, including the filing names and locations, can be determined by the filing instructions, or be supplied by the third party providing document storage.

In most cases, the indexing information that was supplied by the user is associated to the document image using the globally unique identifier and then filed. This indexing information can be filed with the document image, or in a separate database maintained for this purpose.

In accordance with the preferred embodiment, the dynamic control document is implemented using the Extensible Markup Language (XML). XML is a type of markup language that provides significant advantages over other, traditional markup languages. XML is at its core an extensible markup language. In a sense, it is a markup design language or meta language from which other markup languages can be derived. XML can thus be used to define customized markup languages for many different classes of documents. XML is more powerful than other traditional markup languages such as HTML because it provides a mechanism to develop new types of document instructions.

Turning now to FIGS. 4a and 4b, an exemplary dynamic control document implemented using XML is illustrated. A dynamic control document is associated with each document image and is utilized to store data and instructions for processing the document image. Furthermore, as the document image is processed, the dynamic control document is updated to contain selected results from the document image processing.

The exemplary XML dynamic control document uses a variety of tags to designate different data types and flow instructions. The flow manager and other components in the paper gateway parse the XML dynamic control document looking for data and flow instructions. These elements also modify and update the XML dynamic control document as it is processed through the paper gateway.

The XML dynamic control document illustrated in FIG. 4 is exemplary of a XML dynamic control document that is created when a document image is first received by the paper gateway. The contents of the initial XML dynamic control document will now be discussed, but those skilled in the art will recognize that these tags and their uses are merely exemplary of the types of tags and data that can be stored in a dynamic control document. It should also be noted that the names and data structures given to the tags are merely exemplary and can be changed without departing from the scope of the invention.

The <queuetypeid> tag designates the next component in the document processing flow. In this example, the <queuetypeid> tag designates that the Document Discriminator is the next component that will operate on the associated document image.

The source date node contains the general information about the document image. In particular, the <sourcename> tag indicates the name of the source that this document image file originated from. This example designates the source as a folder input. In other cases the designated input could be from fax or email devices. The <deviceserver> tag likewise designates the name of the server this source is on. The <deletesimilarfiles> tag allows the for the selective automatic cleanup of files having the same name, but different extensions. The <sourcefile> tag gives the name and location of the associated image file that is being processed.

The trace node controls automatic logging of processing for the document image. In particular, the <tracedata> tag allows for the use of automatic logging of processing, and the <traceid> tag designates the component that performs the tracing. The <loglevel> tag and <logtype> tag specifies the level and type of tracing, while the <loglocation> tag designates the location of the trace file.

The next sections describe the operations performed by the document discriminator. The first section describes the main flow, which is performed by calling external elements to perform desired actions. The second section describes the internal processing performed by the document discriminator. These operations are performed on each document image that is processed using this exemplary dynamic control document.

The <docdiscriminatorflow> tag describes the main flow performed by the document discriminator in operation. In particular, the <main flow data> tag describes the external operations called by the document discriminator. In this example, if the document discriminator does not find any barcodes, the document discriminator will first call BCR1 (a barcode code recognition component identified with the <queuetypeid> tag) and then it will call SplitTiff (the component that splits the document image into multiple documents). The document discriminator knows which step in the main flow to perform next by examining then <nextstep> tag further down the document.

The <docflow> node then describes the internal processing that is to be performed by the document descriminator. This internal processing is performed, along on every image that is processed by the document discriminator.

The <progid> tags are used to designate the internal processing routines performed by the document discriminator. In this example, the ktagDocLoc.DocLoc process is for locating batch starting and ending document. The ktagStandardLoc.StandardLoc process is the standard processes of locating the start and stop page of individual documents by searching for designating barcodes. The ktagValidateDoc.ValidateDoc process is an evaluation routine that determines if located barcodes properly designate a valid document.

Finally, the <nextstep> tag indicates what processing step is the next step for the document discriminator, and the <complete> tag indicates when the document discriminator processing has been completed.

The next node, designated <job> stores data related to the document image. In particular, the <joblocation> designates the location of the document image. The <jobid> tag indicate the unique identifier for this job, the <jobextension> tag indicates the file type for the job, and the <pagecount> tag indicates the number of pages in the tag.

The next node, designated <source instruction> defines any source-specific instructions that are set for documents from this source. The <documentthreshold> tag indicates the minimum confidence level the recognition software must achieve for a located barcode to be considered valid. The <usedocloc> tag indicates whether or not to use document locking for documents from this source. The <batchstartensign> and <batchendensign> tags indicate what type of barcodes to look for at the start and end of each document. The <deletesourcefile> tag indicates whether or not to delete the image source file after processing. The <Barcodethreshold> indicates what confidence level is required to consider the barcode to be valid. Finally, the <requireindex> tag indicates whether or not a document has to be indexed by scanner before it will be processed.

The dynamic control document thus describes a process flow where the document discriminator initiates a BCR1 flow to search for barcodes. After finding the barcodes, the BCR1 flow returns to the flow the document discriminator. After the barcodes have been found, the document discriminator then calls the SplitTiff element to divide the document.

Turning now to FIG. 5, a second portion dynamic control document implemented using XML is illustrated. This document portion illustrates the data added to the dynamic control after barcode recognition is performed. The illustrated document portion would be added to the XML dynamic control document illustrated in FIGS. 4a and 4b. By adding the second portion to the dynamic control document, the dynamic control document is updated to reflect that this further processing has been performed, and now contains information from the document image that was added during this processing.

The added second portion includes a <barcode> node that has been added with new tags and data to reflect the results obtained during barcode recognition. For example, the <imagetag> tag indicates the barcode number retrieved from the document. Likewise, the , <confidence>, <orientation>, <left>, <top>, <height>, <width> and <skew> indicate other barcode parameters obtained during barcode recoginition. The <time>, <bcr> and <lib> tags are used to track information about the barcode recognition element that processed the image and its performance. Thus, these various result tags are used to dynamically store the results of the image processing.

The process stats node lists processing stats that can be used to evaluate the performance of the components, such as the processing of barcode code and split tiff components. Not shown in FIG. 5 is the change to the <queuetypeid> tag of the original dynamic control document, which would be updated to reflect that the barcode recognition is the next component in the document flow.

Turning now to FIG. 6, a third portion of a dynamic control document implemented using XML is illustrated. The illustrated document portion would be added to the XML dynamic control document illustrated in FIGS. 4a, 4b and 5. This example illustrates the portion of the dynamic control added after the document discriminator has processed the document. The dynamic control document has thus been updated with further result tags to reflect that this further processing has been performed, and now contains information from document that was added during this processing.

The added third portion of the dynamic control document includes a <processedbarcodes> tag to designate the data obtained from the barcode recognition and the document discriminator. This data includes a <barcodelength> tag indicating the length of the recognized barcode, an <orientation> tag indicating the orientation of the barcode, and a <barcodepage> indicating what page the barcode was found on. Additionally, the <isvalidpage> tag indicates whether the page was valid, and the <ignored> tag indicates whether there were additional barcodes that were ignored. Finally, the <barcode> tag gives the barcode identity, and the <used> tag indicates whether this barcode has been processed.

The next node lists document data under a <document> tag. This node includes the data the document discriminator creates when processing the document. It should be noted that each <row> in the document data refers to different documents that were found in the document image. Thus, if multiple documents were found, there would be multiple rows in this node. The node in this data includes copies of some of the barcode data discussed above. Additionally, this node includes a <isvaliddoc> tag to indicate whether the document associated with this node is valid (e.g., if it was indexed before it was scanned, where required). The <userid> and <orgid> tags indicate the user and organization then sent this document. This information would generally be obtained from the indexing information provided by the user—and retrieved using the located barcode data. Likewise, the <docid> tag indicates the unique document identification assigned by the database, the <version> tag indicates the document version, and the <drawerid> tag indicates the indexing drawer where the document is located. Finally, the <isexpected> tag indicates whether this document was expected and the <autoindex> indicates whether the document was autoindexed.

Not shown in FIG. 6 is the change to the <queuetypeid> tag of the original dynamic control document, which would be updated to reflect that the split tiff component is the next component in the document flow.

Turning now to FIG. 7, a fourth portion of the dynamic control document implemented using XML is illustrated. The illustrated document portion would be added to the XML dynamic control document illustrated in FIGS. 4a, 4b, 5 and 6. This example illustrates the new portion added after the document divider (e.g., split tiff) has processed the document. The dynamic control document has thus been updated to reflect that this further processing has been performed, and now contains information from the document that was added during this processing.

The added fourth portion of the dynamic control document includes a <filelist> node has that corresponds to the individual documents found in this document image. In this example, there is one document and thus one row of data, but if there had been multiple documents there would be multiple rows in the file list node, with one for each separate document. The <filename> tag gives the name of the separate document images created from the original source document image.

Not shown in FIG. 7 is that the <queuetypeid> tag would also be updated to reflect that the image instructions element is the next component in the document flow. In operation, a reference for each separate document in the document image would be passed to the image instruction element, thus starting a separate process flow for each individual document.

Turning now to FIG. 7a, a fifth portion of a dynamic control document implemented using XML is illustrated. The illustrated document portion would be added to the XML dynamic control document illustrated in FIGS. 4a, 4b, 5, 6 and 7. This example illustrates the dynamic control after the image instructions component has processed the document. The dynamic control document has thus been updated to reflect that this further processing has been performed, and now contains information from document that was added during this processing.

This document portion adds <docimageinstrdata> node and a <docimageinstructions> node. These nodes contain the image instructions that have been retrieved (using the barcode information) and are to be applied to this document. In particular, the <instrid> tags specify the instructions that are to be applied to this document by giving the database ID for the instructions. The <instrypeid> tags specify the type of instructions, and the <executeorder> tags specify the order of instructions. The <progid> tags indicate the component will be called to process the instructions.

Not shown in FIG. 7a is that the <queuetypeid> tag would also be updated to reflect that the delivery instructions element is the next component in the document flow.

Turning now to FIG. 7b, a fifth portion of a dynamic control document implemented using XML is illustrated. The illustrated document portion would be added to the XML dynamic control document illustrated in FIGS. 4a, 4b, 5, 6, 7 and 7a. This example illustrates the dynamic control after the image instructions component has processed the document. The dynamic control document has thus been updated to reflect that this further processing has been performed, and now contains information from document that was added during this processing.

In this portion a <deliveryinstr> node has been added. This node contains the delivery instructions that have been retrieved (again, using the barcode information) and are to be applied to this document. In particular, the <queuetypeid> and <name> tags specify the component that the processed document is to be sent to. Likewise, the <deliveryinstrid> gives the identification for the specification delivery instructions that are to be applied.

Not shown in FIG. 7b is that the <queuetypeid> tag has been updated to reflect that the document destination is the next component in the document flow.

FIGS. 4–7b thus illustrate an exemplary XML dynamic control document and how that document is updated and changed to reflect image processing. The dynamic control document is updated to contain selected results from the document image processing. Those skilled in the art will recognize that this is merely exemplary and that other tags and data can be added to, or removed from the dynamic control document while providing the benefits of the claimed invention.

The preferred embodiments of the present invention thus provide an apparatus and method for dynamic routing using dynamic data streams. Dynamic routing using dynamic data streams facilitates the creation of a flexible paper gateway in a digital filing system that provides for receiving, processing and storing document images from a wide variety of sources. When thus implemented, dynamic routing allows the digital filing system to efficiently operate while providing digital filing services to a wide variety of users with different needs. Thus, the preferred embodiments provide for the efficient digital filing and efficient management of paper-based information from its receipt at the desktop through an indexing, scanning, image storage and image retrieval process.

The preferred embodiments of the present invention utilize a dynamic control document that is associated with each document image. Each dynamic control document stores data and instructions for the processing and storage of the document image. The dynamic controls document controls the parameters of the document image processing from receipt through to final filing. Furthermore, as the document image is processed, the dynamic control document is updated to contain selected results from the document image processing.

By using the dynamic control document, the preferred method and apparatus provide a mechanism for the receipt, processing, indexing and filing of paper based documents with unparalleled efficiency and flexibility.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   a digital image of a paper-based document, the digital image of the paper based document including an image of a label; and
   a paper gateway application residing in the memory and being executed by the at least one processor, the paper gateway application receiving the digital image of the paper-based document and creating a dynamic control document associated with the image of the paper based document, the dynamic control document including data and processing instructions for the digital image, and wherein the paper gateway parses the dynamic control document to at least partially control document image processing.

2. The apparatus of claim 1 wherein the paper gateway updates the dynamic control document with results from the image processing.

3. The apparatus of claim 1 wherein the paper gateway extracts a unique identifier from the image of the label and uses the unique identifier to link the digital image to a database record, and wherein the paper gateway updates the dynamic control document with information relating to the unique identifier and the database record.

4. The apparatus of claim 3 wherein the paper gateway links the digital image to the record by using at least a portion of the globally unique document number to create a file name for the digital image.

5. The apparatus of claim 1 wherein the dynamic control document is implemented using extensible markup language (XML).

6. The apparatus of claim 1 wherein the dynamic control document includes a next component tag for indicating a next component to perform image processing, and wherein the next component tag is updated at each step of the image processing.

7. The apparatus of claim 1 wherein the dynamic control document includes a plurality of results tags for indicating results from image processing, and wherein the results tags are updated at each step of the image processing.

8. The apparatus of claim 1 wherein the paper gateway includes a flow manager, the flow manager controlling operation of the paper gateway by parsing the dynamic control document for document processing instructions.

9. The apparatus of claim 1 wherein the paper gateway includes a document receiver, the document receiver receiving the document image from one of a plurality of sources and initiating image processing of the document image.

10. The apparatus of claim 9 wherein the document receiver further converts the document image into a common format.

11. The apparatus of claim 1 wherein the paper gateway further includes a document discriminator, the document discriminator parsing the document image for the image of the label and determining a unique identifier from the image of the label.

12. The apparatus of claim 1 wherein the digital image of a paper-based document includes a plurality of label images, each of the plurality of label images corresponding to a separate paper-based document, and wherein the paper gateway further includes a document discriminator, the document discriminator parsing the document image for the plurality of label images and determining a unique identifier from each of the label images.

13. The apparatus of claim 12 wherein the paper gateway further includes a document divider, and wherein the document divider splits the digital image of a paper based document into a plurality of digital images according to the plurality of label images, and wherein the document divider creates a dynamic control document for each of the plurality of digital images.

14. The apparatus of claim 1 wherein the paper gateway further includes an image processor, wherein the image processor retrieves image processing instructions corresponding to the image label and adds the image processing instructions to the dynamic control document.

15. The apparatus of claim 1 wherein the paper gateway further includes a document filer, wherein the document filer retrieves the document filing instructions corresponding to the image label and adds the filing instructions to the dynamic control document.

16. An apparatus comprising:
   at least one processor;
   a memory coupled to the at least one processor;
   a digital image of a paper-based document, the digital image including an image of a label that includes a unique identifier, the digital image residing in the memory; and a paper gateway application residing in the memory and being executed by the at least one processor, the paper gateway application receiving the digital image of the paper-based document and creating a dynamic control document associated with the image of the paper based document, the paper gateway application including;
- a flow manager, the flow manager controlling processing of the digital image by parsing the dynamic control document for document processing instructions;
- a document discriminator, the document discriminator parsing the document image for the image of the label and determining the unique identifier from the image of the label; and
- an image processor, wherein the image processor retrieves image processing instructions corresponding to the unique identifier and adds the image processing instructions to the dynamic control document.

17. The apparatus of claim 16 wherein the dynamic control document is implemented using an extensible markup language (XML).

18. The apparatus of claim 16 wherein the paper gateway further includes a document receiver, the document receiver receiving the document image from one of a plurality of sources and initiating image processing of the document image.

19. The apparatus of claim 16 wherein the paper gateway further includes a document divider, and wherein the document divider splits the digital image of a paper based document into a plurality of digital images according to the plurality of label images, and wherein the document divider creates a dynamic control document for each of the plurality of digital images.

20. The apparatus of claim 16 wherein the paper gateway further includes a document filer, wherein the document filer retrieves the document filing instructions corresponding to the image label and adds the filing instructions to the dynamic control document.

21. The apparatus of claim 16 wherein the paper gateway uses the unique identifier from the label image to link the digital image to a database record previously created by a user.

22. The apparatus of claim 16 wherein the dynamic control document includes a next component tag for indicating a next component to perform image processing, and wherein the next component tag is updated at each step of the image processing.

23. The apparatus of claim 16 wherein the dynamic control document includes a plurality of results tags for indicating results from image processing, and wherein the results tags are updated at each step of the image processing.

24. A method comprising the steps of:
- receiving a document image including a label image that comprises a unique identifier;
- creating a dynamic control document corresponding to the document image;
- performing image processing on the document image as specified by the dynamic control document; and
- updating the dynamic control document with results from the image processing of the document image.

25. The method of claim 24 further comprising the step of parsing the document image for the label image to determine the unique identifier and updating the dynamic control document corresponding to the unique identifier.

26. The method of claim 25 further comprising the step of retrieving image processing instructions corresponding to unique identifier and updating the dynamic control document corresponding to the image processing instructions.

27. The method of claim 25 further comprising the step of retrieving filing instructions corresponding to unique identifier and updating the dynamic control document corresponding to the filing instructions.

28. The method of claim 24 wherein the step of creating a dynamic control document corresponding to the document image comprises providing an extensible markup language (XML) dynamic control document.

29. The method of claim 24 further comprising the step of locating a plurality of label images in the document image.

30. The method of claim 29 further comprising the step of splitting the document image into a plurality of digital images according to the located plurality of label images.

31. The method of claim 30 further comprising the step of creating a dynamic control document for each of the plurality of digital images.

32. The method of claim 24 further comprising the step of converting the document image into a common file format.

33. A method comprising the steps of:
- receiving a document image including a label image that comprises a unique identifier;
- creating a dynamic control document corresponding to the document image;
- parsing the document image for the label image to determine the unique identifier and updating the dynamic control document corresponding to the unique identifier;
- retrieving image processing instructions corresponding to unique identifier and updating the dynamic control document corresponding to the image processing instructions; and
- perform image processing according to the dynamic control document.

34. The method of claim 33 further comprising the step of retrieving filing instructions corresponding to unique identifier and updating the dynamic control document corresponding to the filing instructions.

35. The method of claim 33 further comprising the steps of locating a plurality of label images in the document image, splitting the document image into a plurality of digital images according to the located plurality of label images and creating a dynamic control document for each of the plurality of digital images.

36. The method of claim 35 further comprising the step of converting the document image into a common file format.

37. The method of claim 33 wherein the step of creating a dynamic control document corresponding to the document image comprises providing an extensible markup language (XML) dynamic control document.

38. A program product comprising:
- a paper gateway application residing in the memory and being executed by the at least one processor, the paper gateway application receiving a digital image of the paper-based document and creating a dynamic control document associated with the image of the paper based document, the dynamic control document including data and processing instructions for the digital image, and wherein the paper gateway parses the dynamic control document to at least partially control document image processing; and
- signal bearing media bearing the page gateway application.

39. The program product of claim 38 wherein the signal bearing media comprises recordable media.

40. The program product of claim 38 wherein the signal bearing media comprises transmission media.

41. The program product of claim 38 wherein the paper gateway updates the dynamic control document with results from the image processing.

42. The program product of claim 38 wherein the paper gateway extracts a unique identifier from the image of the label and uses the unique identifier to link the digital image to a database record, and wherein the paper gateway updates the dynamic control document with information relating to the unique identifier and the database record.

43. The program product of claim 42 wherein the paper gateway links the digital image to the record by using at least a portion of the globally unique document number to create a file name for the digital image.

44. The program product of claim 38 wherein the dynamic control document is implemented using extensible markup language (XML).

45. The program product of claim 38 wherein the dynamic control document includes a next component tag for indicating a next component to perform image processing, and wherein the next component tag is updated at each step of the image processing.

46. The program product of claim 38 wherein the dynamic control document includes a plurality of results tags for indicating results from image processing, and wherein the results tags are updated at each step of the image processing.

47. The program product of claim 38 wherein the paper gateway includes a flow manager, the flow manager controlling operation of the paper gateway by parsing the dynamic control document for document processing instructions.

48. The program product of claim 38 wherein the paper gateway includes a document receiver, the document receiver receiving the document image from one of a plurality of sources and initiating image processing of the document image.

49. The program product of claim 48 wherein the document receiver further converts the document image into a common format.

50. The program product of claim 38 wherein the paper gateway further includes a document discriminator, the document discriminator parsing the document image for the image of the label and determining a unique identifier from the image of the label.

51. The program product of claim 38 wherein the digital image of a paper-based document includes a plurality of label images, each of the plurality of label images corresponding to a separate paper-based document, and wherein the paper gateway further includes a document discriminator, the document discriminator parsing the document image for the plurality of label images and determining a unique identifier from each of the label images.

52. The program product of claim 51 wherein the paper gateway further includes a document divider, and wherein the document divider splits the digital image of a paper based document into a plurality of digital images according to the plurality of label images, and wherein the document divider creates a dynamic control document for each of the plurality of digital images.

53. The program product of claim 38 wherein the paper gateway further includes an image processor, wherein the image processor retrieves image processing instructions corresponding to the image label and adds the image processing instructions to the dynamic control document.

54. The program product of claim 38 wherein the paper gateway further includes a document filer, wherein the document filer retrieves the document filing instructions corresponding to the image label and adds the filing instructions to the dynamic control document.

55. A program product comprising:
a paper gateway application, the paper gateway application receiving a digital image of the paper-based document and creating a dynamic control document associated with the image of the paper based document, the paper gateway application including;
a flow manager, the flow manager controlling processing of the digital image by parsing the dynamic control document for document processing instructions;
a document discriminator, the document discriminator parsing the document image for a image of a label and determining the unique identifier from the image of the label; and
an image processor, wherein the image processor retrieves image processing instructions corresponding to the unique identifier and adds the image processing instructions to the dynamic control document; and
signal bearing media bearing the page gateway application.

56. The program product of claim 55 wherein the signal bearing media comprises recordable media.

57. The program product of claim 55 wherein the signal bearing media comprises transmission media.

58. The program product of claim 55 wherein the dynamic control document is implemented using an extensible markup language (XML).

59. The program product of claim 55 wherein the paper gateway further includes a document receiver, the document receiver receiving the document image from one of a plurality of sources and initiating image processing of the document image.

60. The program product of claim 55 wherein the paper gateway further includes a document divider, and wherein the document divider splits the digital image of a paper based document into a plurality of digital images according to the plurality of label images, and wherein the document divider creates a dynamic control document for each of the plurality of digital images.

61. The program product of claim 55 wherein the paper gateway further includes a document filer, wherein the document filer retrieves the document filing instructions corresponding to the image label and adds the filing instructions to the dynamic control document.

62. The program product of claim 55 wherein the paper gateway uses the unique identifier from the label image to link the digital image to a database record previously created by a user.

63. The program product of claim 55 wherein the dynamic control document includes a next component tag for indicating a next component to perform image processing, and wherein the next component tag is updated at each step of the image processing.

64. The program product of claim 55 wherein the dynamic control document includes a plurality of results tags for indicating results from image processing, and wherein the results tags are updated at each step of the image processing.

* * * * *